US010085602B2

(12) United States Patent
McDonald

(10) Patent No.: US 10,085,602 B2
(45) Date of Patent: Oct. 2, 2018

(54) PAY-FOR-USE PORTABLE TOILET FACILITY

(71) Applicant: Brad McDonald, Chicago, IL (US)

(72) Inventor: Brad McDonald, Chicago, IL (US)

(73) Assignee: Brad McDonald, Chicago, IL (US)

( * ) Notice: Subject to any disclaimer, the term of this patent is extended or adjusted under 35 U.S.C. 154(b) by 37 days.

(21) Appl. No.: 15/391,055

(22) Filed: Dec. 27, 2016

(65) Prior Publication Data
US 2017/0181587 A1 Jun. 29, 2017

Related U.S. Application Data

(60) Provisional application No. 62/271,431, filed on Dec. 28, 2015.

(51) Int. Cl.
G07F 7/00 (2006.01)
E04H 1/12 (2006.01)
A47K 11/02 (2006.01)
A47K 13/24 (2006.01)
G07F 5/10 (2006.01)

(52) U.S. Cl.
CPC ............ A47K 11/02 (2013.01); A47K 13/242 (2013.01); E04H 1/1216 (2013.01); G07F 5/10 (2013.01); G07F 7/00 (2013.01)

(58) Field of Classification Search
CPC ........ A47K 13/242; G07F 5/10; E04H 1/1216; E04H 1/1266
See application file for complete search history.

(56) References Cited

U.S. PATENT DOCUMENTS 6,615,414 B2 * 9/2003 Miller ....................... E03D 7/00
4/321
2012/0079650 A1 * 4/2012 Metcalf .................. E03D 11/12
4/311

FOREIGN PATENT DOCUMENTS

EP 2120197 A1 * 11/2009 ............. G06Q 30/02

OTHER PUBLICATIONS

EP 2120197 A1 Machine Translation (retrieved Nov. 1, 2017).*

* cited by examiner

Primary Examiner — Janie Loeppke
(74) Attorney, Agent, or Firm — Quarles & Brady LLP

(57) ABSTRACT

A portable toilet facility generally includes an enclosure comprising a floor, a ceiling, at least one side wall, and at least one door positioned within the at least one side wall, a holding tank disposed inside the enclosure for the storage of waste, and at least one toilet structure disposed inside the enclosure, the at least one toilet structure being in fluid communication with the holding tank. The portable toilet facility further includes at least one lock disposed within the enclosure, the at least one lock preventing and allowing selective access to the toilet structure.

15 Claims, 8 Drawing Sheets

PAY-FOR-USE PORTABLE TOILET FACILITY

CROSS REFERENCE TO RELATED APPLICATIONS

The present application claims the benefit of U.S. Provisional Application No. 62/271,431, filed on Dec. 28, 2015, and entitled "Pay-For-Use Portable Toilet."

BACKGROUND

Embodiments described herein generally relate to pay-for-use portable toilet facilities that may include variable pricing and methods of providing pay-for-use portable toilet facilities that may include variable pricing. Specifically, the present invention details a pay-for-use portable toilet designed to maintain shorter queues so the user saves time and can forego longer queues for a small fee based on the number of people currently waiting which is determined by the present invention's unique flex pricing algorithm.

Portable toilet facilities are often employed for outdoor events where large groups of people congregate. These portable toilet facilities are used to meet the demand for toilets at these events. At times, large queues of people typically form to use portable toilet facilities, thereby dramatically increasing wait time. Large outdoor events, and other situations where portable restrooms are employed, typically do not have enough portable restroom capacity to keep lines and wait times reasonable especially during peak times. This leads to enormous lines for a basic human need with no suitable or sanitary alternatives. Moreover, in the case of a restroom emergency from illness or otherwise, there is generally no reasonable way to skip or shorten the portable restroom line or wait time without the cooperation of others in the queue. It can be understood that attendees at such events usually pay for admission or entrance and do not wish to miss portions of the event to stand in line to use the portable restroom. It would be useful, therefore, to have a portable restroom that provides an option for reduced wait times for those attendees that have an emergency, are ill, or simply prefer not to stand in line waiting to use the portable restroom.

SUMMARY

In light of the above described disadvantages and problems currently surrounding the portable toilet industry, the present invention aims to solve these problems by utilizing a unique price flexing mechanism in conjunction with a locking mechanism and other features described below to achieve shorter wait time for the portable toilet users. The general purpose of the present invention (described in greater detail below) is to provide portable toilet users an alternative solution to waiting in line an extended period of time to use the restroom. A secondary purpose of this invention is to assist those in emergency situations to use a portable toilet immediately or in less time than if the user would use an alternative restroom source. Another objective of the present invention is to provide cleaner, more sanitary portable toilet option for a fee based on the current demand of the present invention. This invention is illustrated in the form below and accompanying drawing and figures, which are illustrative only—changes may be made in specific construction of the invention.

To achieve these goals, the present invention implements new methods demonstrated in the illustrative embodiments below: the portable toilet facility includes an enclosure comprising a floor, a ceiling, at least one side wall, and at least one door positioned within the at least one side wall, a holding tank disposed inside the enclosure for the storage of waste, and a toilet structure disposed inside the enclosure, the toilet structure being in fluid communication with the holding tank. The portable toilet facility may further include a first lock positioned on the toilet structure, the at least one lock preventing and allowing access to the toilet structure.

In other illustrative embodiments, a portable toilet facility includes an enclosure comprising a floor, a ceiling, at least one side wall, and at least one door positioned within the at least one side wall, a holding tank disposed inside the enclosure for the storage of waste, and a toilet structure disposed inside the enclosure, the toilet structure being in fluid communication with the holding tank. The portable toilet facility may further include a first lock disposed within the enclosure, the first lock preventing and allowing access to at least one toilet structure, a second lock coupled to the at least one door, the second lock preventing and allowing access to the at least one door, at least one payment device coupled to the enclosure, and a control system coupled to the enclosure, the control system being operatively connected to the first lock, the second lock, the at least one payment device, and the at least one price-communication device. The control system may include a processor capable of executing device logic to perform one or more of the following steps: send a signal to unlock the second lock upon receipt of payment at the payment device, thereby unlocking the door, send a signal to unlock the first lock upon closure and automatic locking of the door, thereby allowing access to the toilet structure, send a signal to lock the first lock upon closure and locking of the toilet structure, and send a signal to lock the second lock upon closure of the door after exit by a user. The portable toilet facility may also further include a power source electrically connected to the control system, the first lock, the second lock, and the at least one payment device.

In still other illustrative embodiments, a method of providing a portable toilet facility with variable pricing is disclosed. Variable pricing has never been used before for portable toilet facilities such as the invention described herein. The portable toilet facility may comprise an enclosure with at least one door, at least one toilet structure disposed inside the enclosure, a first lock operatively connected to the toilet structure, a second lock operatively connected to the at least one door, at least one payment device coupled to the enclosure, at least one price-communication device coupled to the enclosure and including a display, and a control system including memory storing device logic and a processor in electronic communication with the memory. The processor may be programmed to execute device logic to perform one or more of the following steps: receive a signal indicative of, but not limited to, potential users, a time between uses, or consecutive uses of the portable toilet facility, determine a current price associated with use of the portable toilet facility using the signal indicative of, but not limited to, potential users, a time between uses, or consecutive uses of the portable toilet facility, and send a signal to the at least one price-communication device with the current price.

BRIEF DESCRIPTION OF THE DRAWINGS

Throughout the figures, like reference numerals will be utilized to depict structures that are equivalent between different embodiments.

Figure 1:
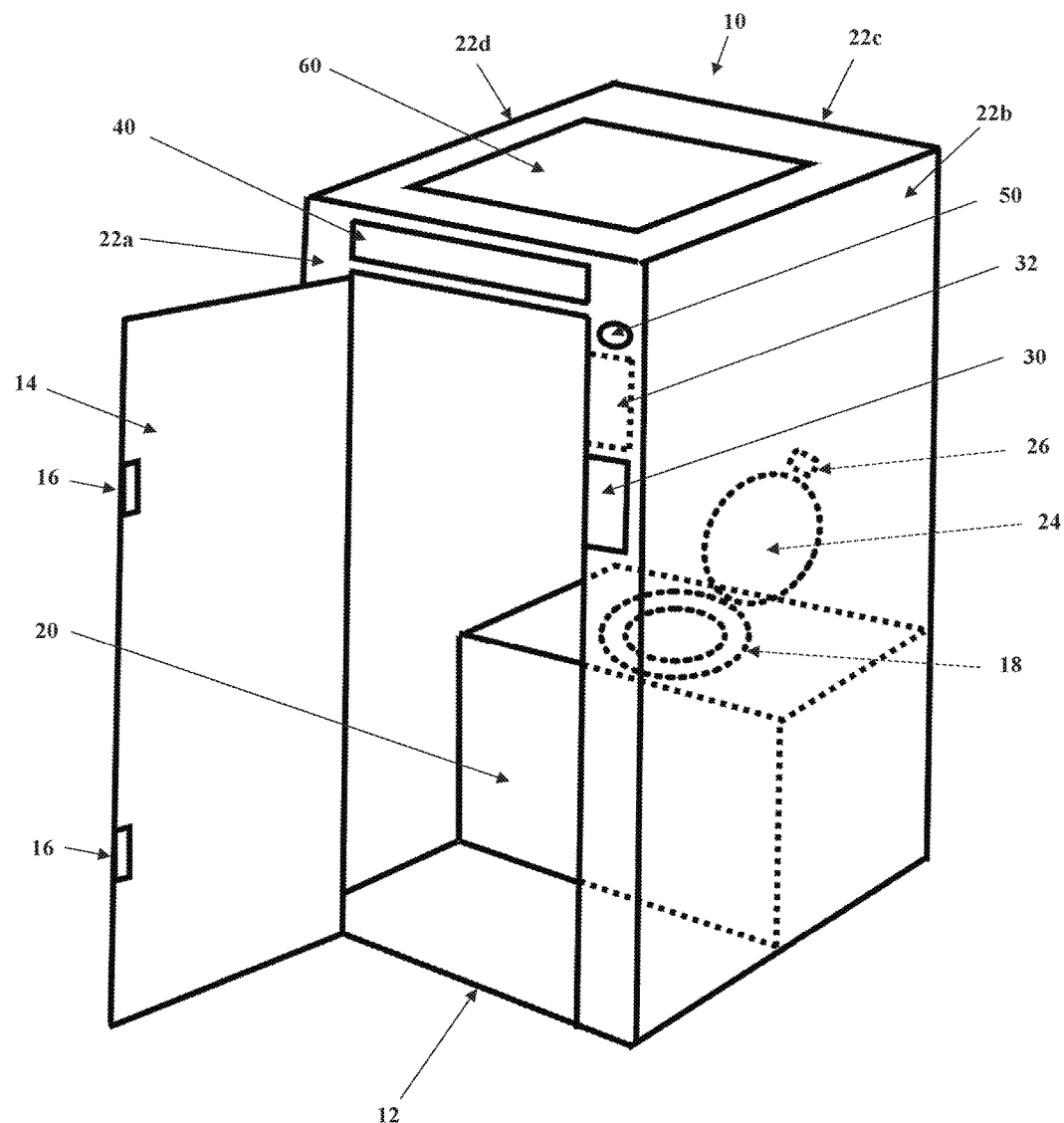
FIG. 1 shows a perspective, schematic view of a portable toilet facility with a cover of a toilet positioned within the portable toilet facility in an open position and a door of the portable toilet facility in an open position.

Several drawings and illustrations have been presented to aid in the understanding of the present invention. The scope of the present invention is not limited to the figures.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, directional terms including "top," "bottom," "side," "horizontal," "vertical," and so on are used to indicate directional relationships with respect to an arbitrary reference frame (e.g., a reference frame of a particular figure or figures). These directional terms are used consistently relative to a particular embodiment. For example, a "top" feature of an embodiment is opposite a corresponding "bottom" feature, and a "horizontal" feature generally extends perpendicularly to a "vertical" feature. However, unless otherwise defined or limited, these directional terms are not intended to indicate an absolute reference frame Referring now to the drawings, in which like numbers refer to like elements throughout the several figures, FIGS. 1-4 show different embodiments of portable toilet facilities of the present disclosure. Embodiments described herein provide a portable toilet facility with variable pricing devices. A first embodiment of a portable toilet facility 10 includes an enclosure 12, at least one door 14 positioned within at least one wall of the enclosure 12, at least one lock 16 preventing and allowing access into the enclosure 12, at least one toilet structure 18, and at least one holding tank 20.

The enclosure 12 is generally formed of at least one wall 22. In the exemplary embodiments, the enclosure 12 is depicted as having fourth walls 22a-22d with first and second opposing walls 22a, 22c being parallel, third and fourth opposing walls 22b, 22d being parallel, and the walls 22a, 22c being perpendicular to each of the walls 22b, 22d. In some embodiments, each of the walls 22a-22d may have a length that is the same, thereby having a cross-sectional shape (taken in a plane parallel to a surface on which the facility 10 sits) that is generally square-shaped. In other illustrative embodiments, the enclosure 12 may include any suitable number of walls and/or may have any suitable cross-sectional shape. Illustrative cross-sectional shapes include, but are not limited to, circular, oval, square-shaped, rectangular, pentagonal, star-shaped, octagonal, or any other geometric shape.

Figure 2:
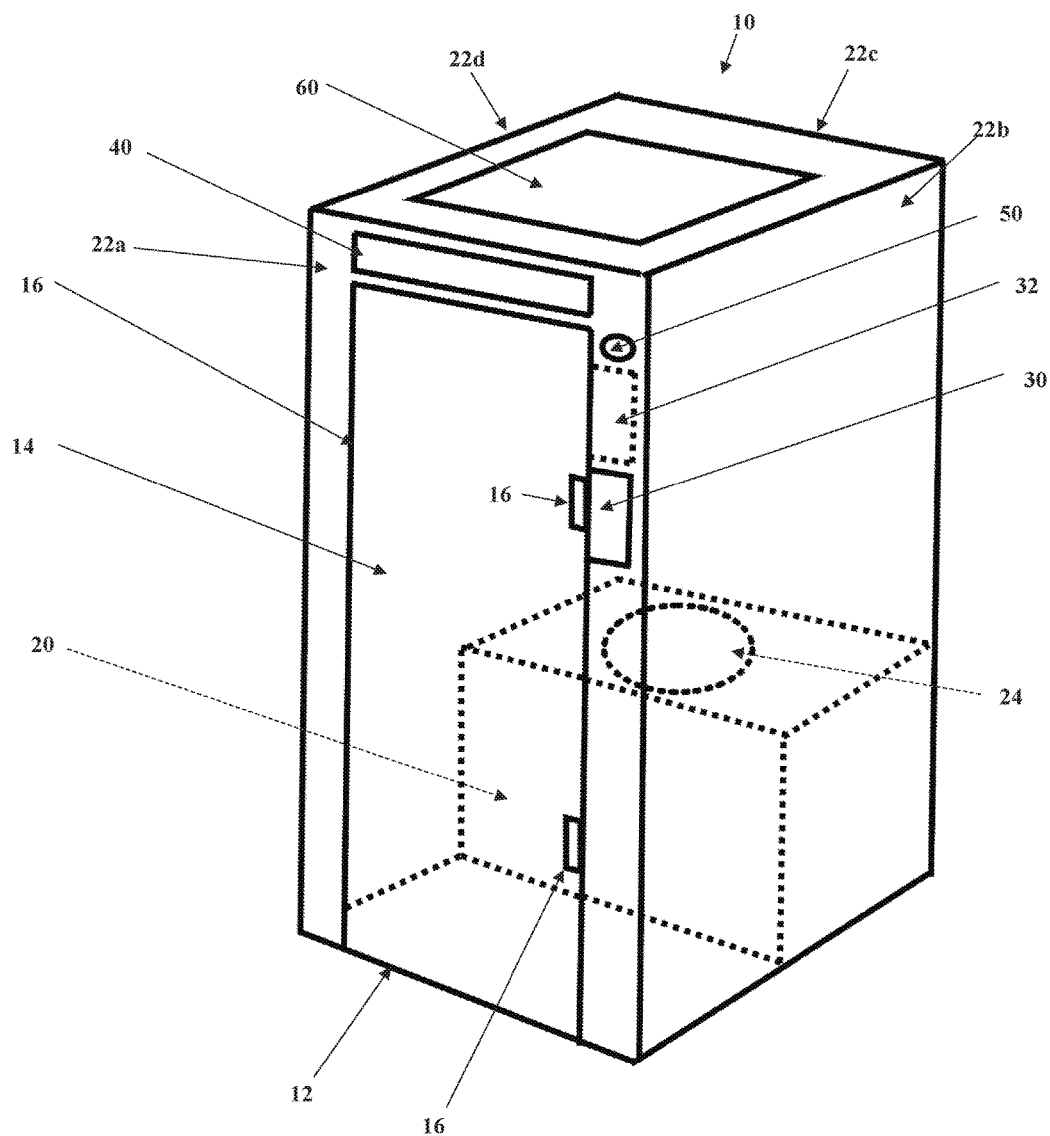
FIG. 2 shows a perspective, schematic view of the portable toilet facility of FIG. 1 with the cover of the toilet in a closed position and the door in a closed position.
Figure 3:
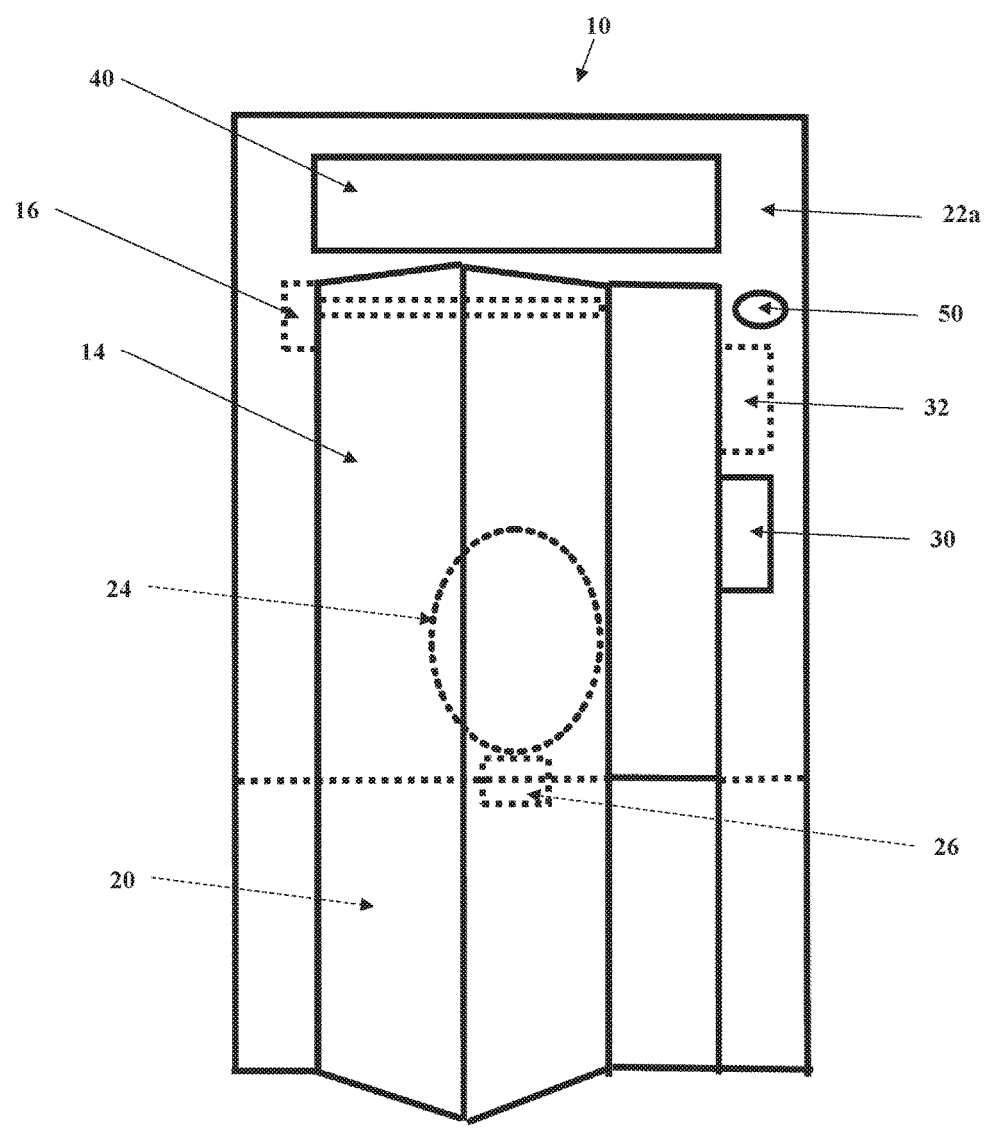
FIG. 3 shows a perspective, schematic view of a further embodiment of a portable toilet facility with the cover of the toilet in the open position, wherein the portable toilet facility has a bi-fold door, which is in a partially open position.
Figure 4:
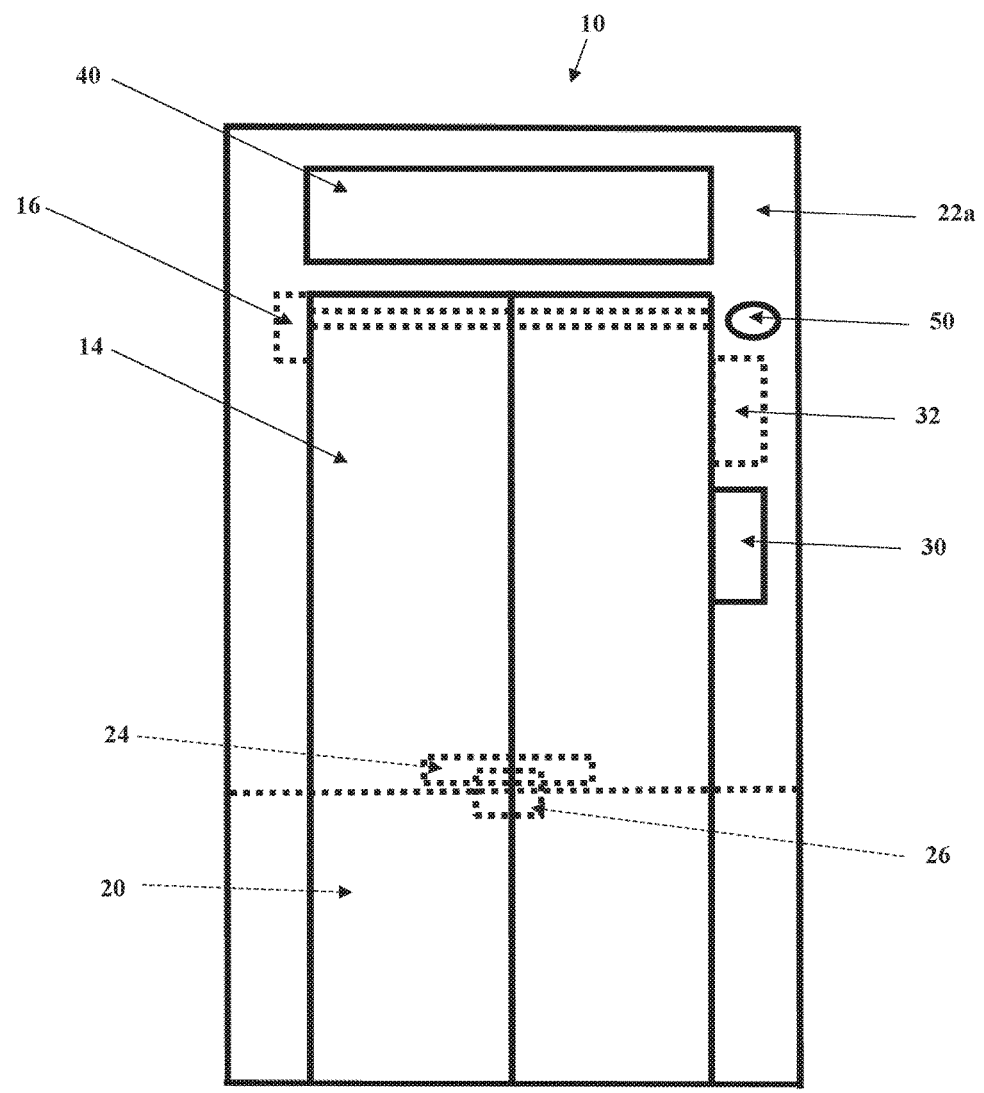
FIG. 4 shows a perspective, schematic view of the embodiment of the portable toilet facility of FIG. 3 with the cover of the toilet in its closed position and the bi-fold door shown in a closed position.

The at least one door 14 is formed in the at least one wall 22 and may be of any suitable construction, such as a sliding door, a bi-fold door, an accordion door, and the like. In embodiments in which the enclosure 12 includes more than one wall 22, the door 14 may be formed in any wall 22 and/or any number of doors 14 may be utilized. In FIGS. 1 and 3, the door 14 is depicted in a partially open position. In FIGS. 2 and 4, the door 14 is shown in a closed position. The at least one lock 16 may be operatively connected to the at least one door 14 such that when the at least one lock 16 is in a locked position, the at least one door 14 will be closed and locked, preventing access into the portable toilet facility 10. When the at least one lock 16 is in an unlocked position, the at least one door 14 will be unlocked, allowing access into the portable toilet facility 10. Any number of locks 16 may be utilized on a single door 14 or on multiple doors 14.

The at least one lock 16 may be electronic or mechanical. The at least one lock 16 may also consist of additional electronic or mechanical components that function to open or close the door 14 to allow or prevent access into the portable toilet facility 10. In some embodiments, the at least one lock 16 may consist of at least one electromagnet. In the embodiment FIGS. 1 and 2, the lock 16 coupled to the door 14 is in the form of an electromagnetic lock. While the lock 16 is shown in the figures as being attached to the door 14, one skilled in the art will understand that the lock 16 may include any number of components on the door 14 and/or one or more walls 22 forming the enclosure 12.

In the embodiment of FIGS. 3 and 4, the lock 16 coupled to the door is in the form of an electronic motor and rail. In other embodiments, the lock 16 may require a code or password and, once payment is received, a one-time code or password may be sent to the user to open the lock 16 (and/or other locks). The at least one lock 16 may be of any suitable construction. While the lock 16 is depicted as being positioned on one side of the door 14, the lock 16 may alternatively or additionally be positioned on any side of the door including on the hinges in the form of an electronic, self-opening damper hinge.

The at least one toilet structure 18 may be of any type, such as a toilet, a urinal, a squatting pan, and the like. The at least one toilet structure 18 is in fluid communication with the holding tank 20 for collection of solids and fluids. At least one cover 24 for covering and preventing access to the at least one toilet structure 18 may be attached to the at least one toilet structure 18 or to another structure within the portable toilet facility 10. At least one lock 26 may be coupled to the at least one toilet structure 18 and/or the at least one cover 24 such that the at least one lock 26, when in a locked position, fixes the at least one cover 24 to the at least one toilet structure 18, thereby preventing access to the at least one toilet structure 18. The at least one lock 26 may also consist of additional electronic or mechanical components functioning to deploy or withdraw the cover 24. The lock 26 may be of any suitable construction, for example, any of the exemplary locks described above with respect to the lock 16.

Embodiments of the present invention comprise at least one payment device 30, such as a credit card reader and the like, coupled to the enclosure 12 of the portable toilet facility 10. The at least one payment device 30 operatively communicates with an operating device 100 that is coupled to the enclosure 12 of the portable toilet facility 10. As will be discussed in more detail below, the at least one payment device 30 sends a signal to the operating device 100 indicative of payment at the at least one payment device 30 upon submission of payment by a user.

At least one price-communication device 40, such as a speaker, a liquid crystal display, a light-emitting diode, a radio wave emitter, and the like, is coupled to the exterior of the portable toilet facility such that the at least one price-communication device 40 communicates to potential users of the portable toilet facility 10 a current price for obtaining access to the toilet structure 18. The operating device 100 (as will be discussed below) operatively communicates with the at least one price-communication device 40 such that the operating device 100 sends a signal indicative of the current price to use the portable toilet facility 10 to the at least one price-communication device 40 causing the at least one price-communication device 40 to communicate the current price to potential users of the portable toilet facility 10.

Certain embodiments may comprise at least one sensor 50 coupled to the enclosure 12, the at least one sensor 50 positioned to detect a number of potential users of the portable toilet facility 10 and/or a crowd around the facility 10. The at least one sensor 50 operatively communicates with the operating device 100 such that the at least one sensor 50 sends a signal indicative of the number of potential users detected to the operating device 100. The operating device 100 determines a current price associated with use of the portable toilet facility 10 using the signal indicative of the number of potential users.

In other embodiments, the operating device 100 determines a current price associated with use of the portable toilet facility 10 using the signal indicative of payment at the at least one payment device 30 upon submission of payment by a user. In these embodiments, the operating device 100 may determine, for example, based on time passed between exit of one user and payment by the next, an appropriate payment amount. For example, the less average time between exit of one user and entrance of the next, the greater the payment required and the more time between exit of one user and payment by the next, the lesser the payment.

A power supply 60, such as a battery, a solar panel, and the like, may supply power to the portable toilet facility 10, the operating device 100, and all of the components within the portability toilet facility 10.

A control system 32 is comprised of the locks 16, 26, the payment device 30, the price-communication device 40, the sensor 50, and/or any other components that may be electronically controlled. As will be described in greater detail below, the components of the control system 32 are in communication with one another to control use of the portable toilet facility 10. While the control system 32 and/or electrical components of the portable toilet facility 10 are described herein as being positioned in a particular location, the control system 32 and/or other components may be positioned anywhere within or on the portable toilet facility 10 or remote from the portable toilet facility.

Figure 6:
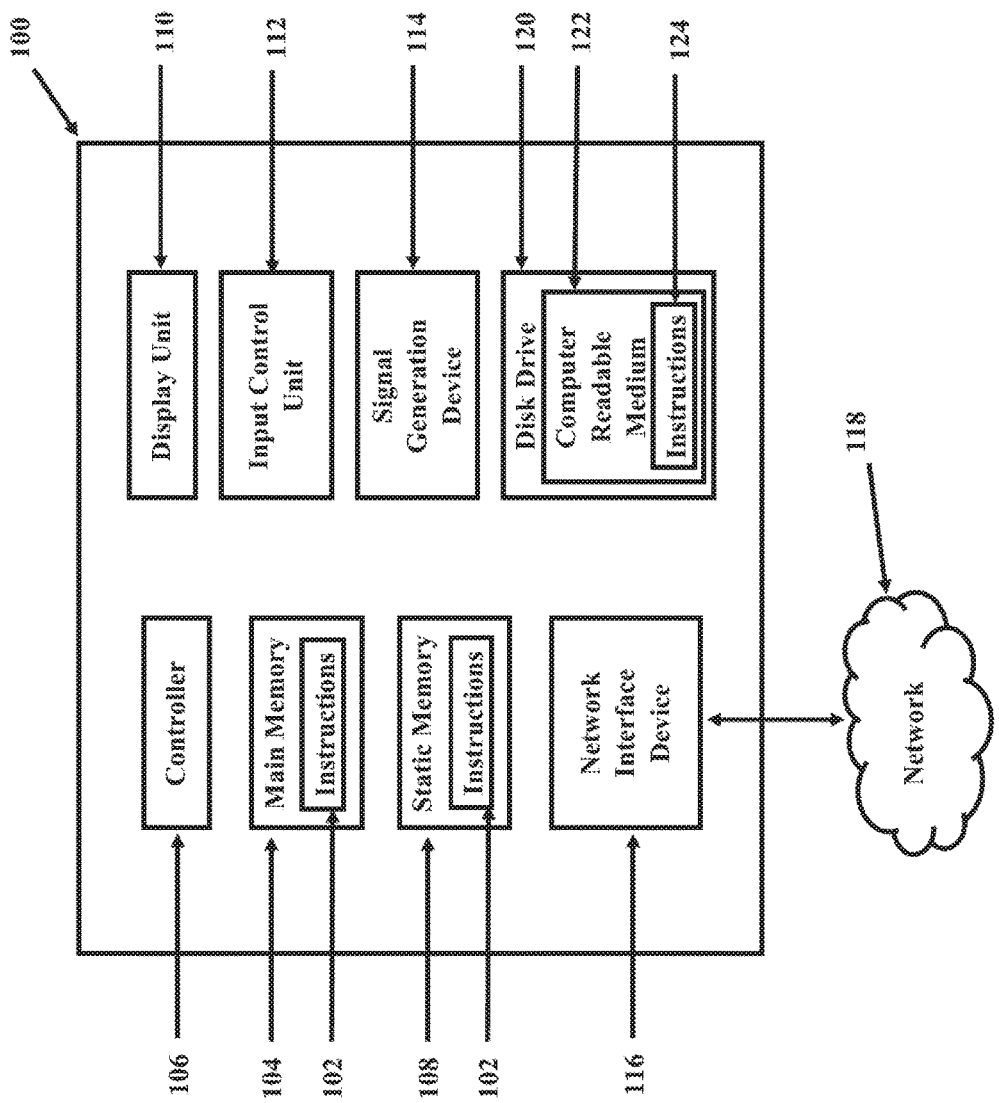
FIG. 6 is a diagram depicting an operating device that may be part of the control system depicted in FIG. 5.

FIG. 6 illustrates an example of an operating device 100 that may be used to implement the methods disclosed herein. Although the operating device 100 is illustrated in FIG. 6 as including all of the illustrated components, it is within the scope of this disclosure for the operating device 100 to be comprised of fewer, or more, components than illustrated in FIG. 6.

The operating device 100 can include a set of instructions 102 that can be executed to cause the operating device 100 to perform any one or more of the methods, processes or computer-based functions disclosed herein. For example, the methods herein may include any number of instructions 102 that are executed by a controller 106 to perform any one or more of the methods, processes or computer-based functions described herein. Such a program may be stored in whole, or in any combination of parts, on one or more of the exemplary memory components illustrated in FIG. 6, such as main memory 104, static memory 108, or a disk drive.

As described, the operating device 100 may be, for example, a mobile device or other processing device. The operating device 100 may also be connected using a network 118, to other components, computer systems or peripheral devices.

As shown in FIG. 6, the operating device 100 may further include a display unit 110 or more input devices 112, such as a keyboard, push button(s), scroll wheel, digital camera for image capture and/or visual command recognition, touch screen, touchpad or audio input device (e.g., microphone). The operating device 100 can also include signal outputting components such as a signal generation device 114 that may include a speaker or remote control. In other illustrative embodiments, the operating device 100 may not include any input or output devices; rather, input and output devices may be connected by a wired or wireless connection to the operating device 100.

The operating device 100 may also include a network interface device 116 to allow the operating device 100 to communicate via wireless, or wired communication channels with other components of the overall control system 32. The network interface device 116 may be an interface for communicating with other components or another computer system via a Wi-Fi connection, Bluetooth connection, Near Frequency Communication connection, telecommunications connection, internet connection, wired Ethernet connection, or the like. The operating device 100 may also optionally include a disk drive unit or other suitable unit 120 for accepting a computer readable medium 122. The computer readable medium 122 may include a set of instructions 124 that are executable by the controller 106, and/or the computer readable medium 122 may be utilized by the operating device 100 as additional memory storage.

In exemplary embodiments, as depicted in FIG. 6, the disk drive unit 122 may include a computer-readable medium 122 in which one or more sets of instructions 124, such as software, as described in more detail below. Further, the instructions 124 may embody one or more of the methods, processes, or logic as described herein. In a particular embodiment, the instructions 124 may reside completely, or at least partially, within the main memory 104, the static memory 108, and/or within the controller 106 during execution by the operating device 100. The main memory 104 and the controller 106 also may include computer-readable media.

In an alternative embodiment, dedicated hardware implementations, including application specific integrated circuits, programmable logic arrays and other hardware devices, can be constructed to implement one or more of the methods described herein.

Figure 5:
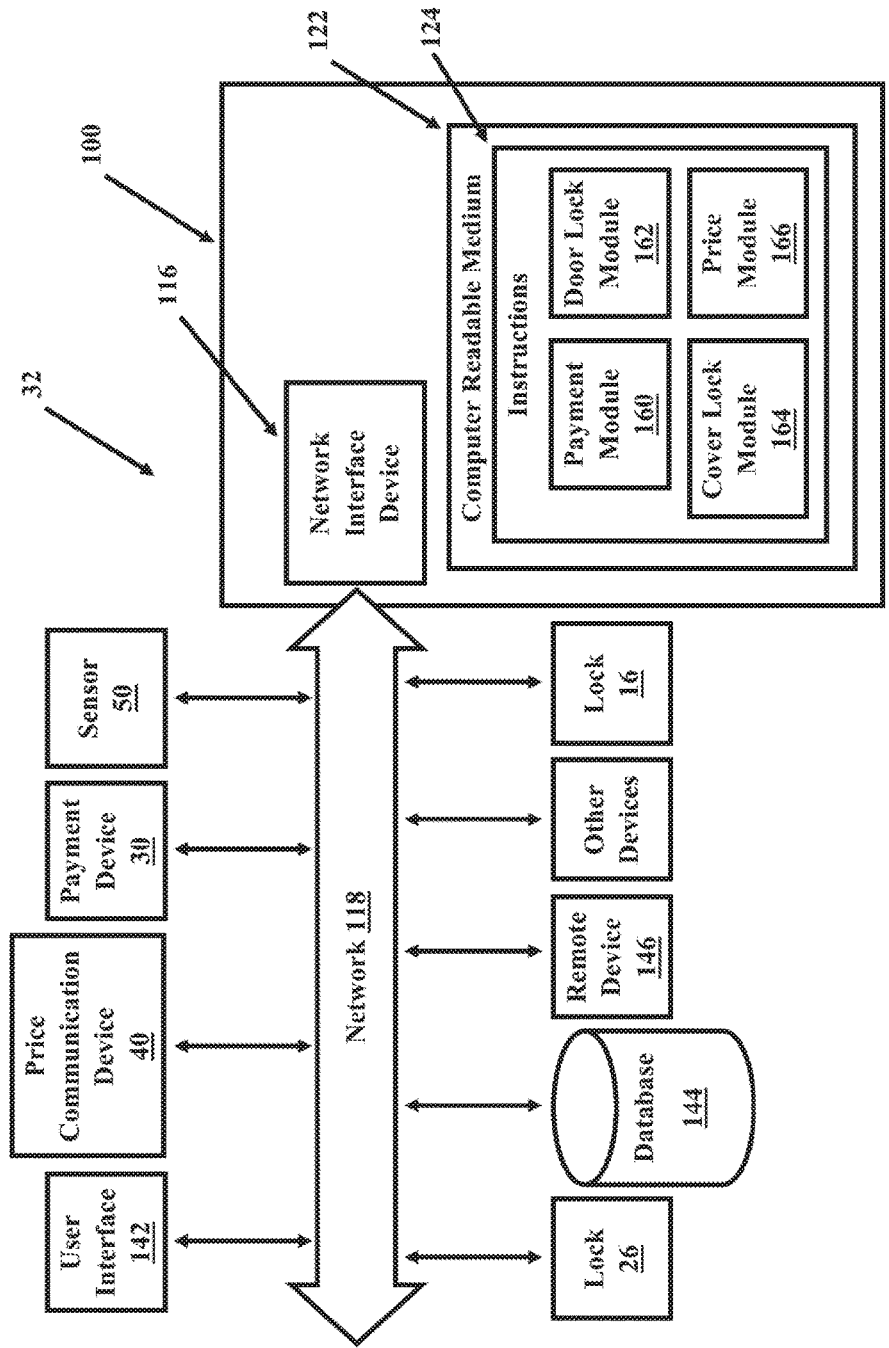
FIG. 5 is a diagram depicting a control system for operation of any of the portable toilet facilities described herein.

Referring now to FIG. 5, an illustrative embodiment of a control system 32 for operating any of the portable toilet facilities 10 herein is depicted. The control system 32 generally includes the computing device 100, which may be positioned within the portable toilet facility 10. While only portions of the computing device 100 (namely, the disk drive 122 with computer readable medium 122 and instructions 124) are depicted in FIG. 6, it should be understood that any of the components of FIG. 6 may be present. The control system 32 further includes a number of peripheral devices that are controlled by the computing device 100, for example, a user interface 142, the lock 16, the lock 26, the payment device 30, the price-communication device 40, the sensor(s) 50, and any other suitable components of the portable toilet facility 10 that may be controlled. As can be seen in FIG. 5, the computing device 100 may communicate over the network 118 (or in any other suitable manner) with the peripheral device, a remote device 146 (e.g., a remote server, a remote computer system, etc.), or may send data for storage in a database 144.

As further seen in FIG. 5 and as will be discussed in greater detail below, the instructions 124 may include a payment module 160 for enabling payment at the at least one payment device 30. The payment module 160 may include instructions to verify the payment method or to perform any other suitable functions. The computer instructions 124 may also include a door lock module 162 that receives signals from the various components of the portable toilet facility 10 and determines when to lock and unlock the door 14 of the facility 10. The computer instructions may include a cover lock module 164 that receives signals from the various components of the portable toilet facility 10 and determines when to lock and unlock the cover 24 to the at least one toilet structure 18. Still further, the computer instructions 124 may include a price module 166 that determines a current price for use of the facility 10 and displays such price on the user interface 142 or another screen outside the facility 10. The user interface 142 may be integral with the payment device 30 and/or the screen for displaying price so that a single signal can be sent back and forth between the user interface 142 or such components could be separate and separate signals may be sent to such components.

Figure 7:
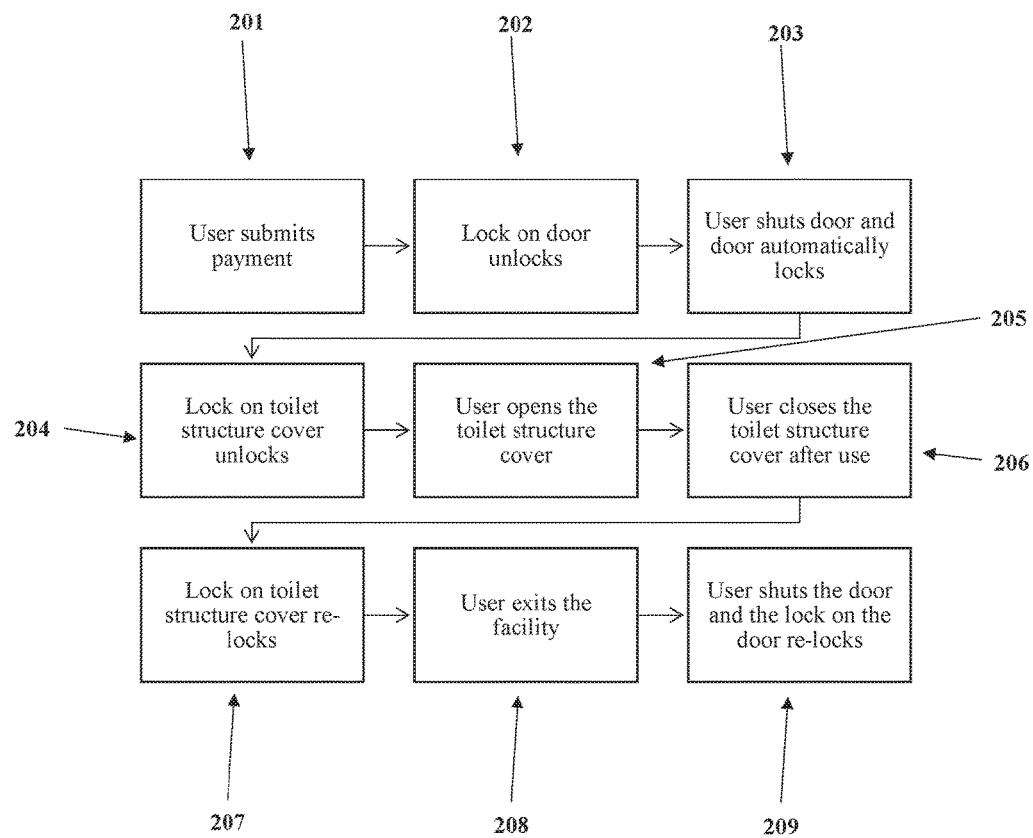
FIG. 7 shows a block diagram outlining how a user would use a portable toilet facility of the present invention.
Figure 8:
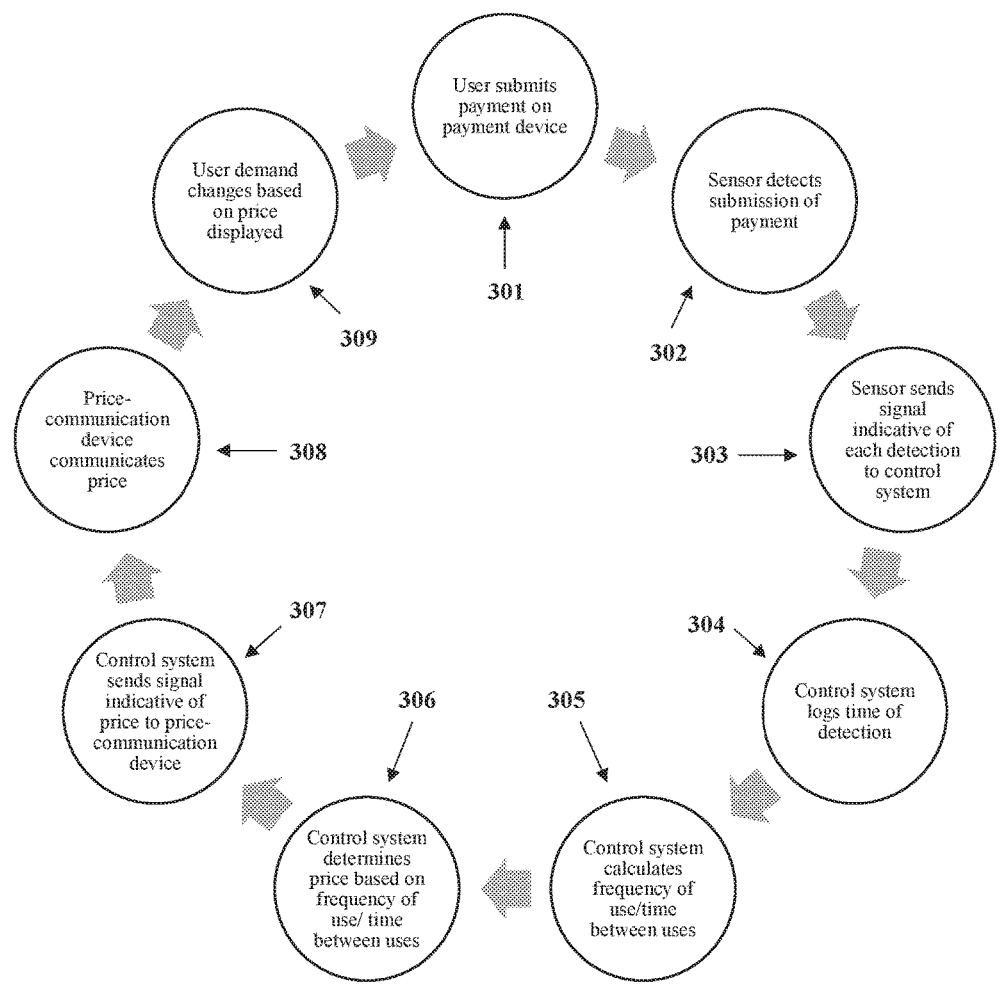
FIG. 8 shows a block diagram outlining how an embodiment of a portable toilet facility of the present invention computes variable pricing for the use of the portable toilet facility.

With the structure of the portable toilet facility 10 and the electronic components of the portable toilet facility 10 being described, an illustrative method of providing a portable toilet facility 10 with variable pricing devices is now discussed. FIGS. 7 and 8 depict flow charts outlining how the control system 32 controls the various components of the portable toilet facility 10.

FIG. 7 depicts how the control system 32 may operate the locks 16, 26 in an exemplary embodiment. In step 201, the user of the portable toilet facility 10 submits payment through the at least one payment device 30. The at least one payment device 30 sends a signal indicative of payment at the at least one payment device 30, upon submission of payment by a user, to the operating device 100. Upon receiving the signal from the at least one payment device 30, the operating device 100 sends a signal to lock 16. In step 202, upon receiving the signal from the operating device 100, the at least one lock 16 coupled to the door 14 switches from a locked position to an unlocked position, unlocking the door 14 and allowing the user access into the enclosure 12e. In step 203, the user enters the enclosure 12 and shuts the door 14, at which point lock 16 is automatically locked. In step 204, once the door 14 is shut and locked, the at least one lock 26 on the at least one toilet structure 18 is unlocked. In step 205, with the at least one lock 26 coupled to the at least one toilet structure 18 unlocked, the user opens the cover 24 or the cover 24 opens by means of any additional electronic or mechanical components in the at least one lock 26.

Once the user finishes using the at least one toilet structure 18, in step 206, the user closes the cover 24 or the cover 24 closes by means of any additional electronic or mechanical components in the at least one lock 26. With the cover 24 closed, in step 207, the at least one lock 26 coupled to the at least one toilet structure 18 re-locks, preventing access to the at least one toilet structure 18. Once 18 relocks, 16 unlocks to allow user to exit. In step 208, the user unlocks and opens or merely opens the door 14 and exists the portable toilet facility 10. In step 209, when the door 14 shuts, after the user leaves, the at least one lock 16 coupled to the door 14 re-locks, preventing access into the portable toilet facility 10 until next payment is made.

FIG. 8 depicts how the control system 32 may determine and communicate variable pricing in illustrative embodiments. In step 301, the user of the portable toilet facility 10 submits payment through the at least one payment device 30. In step 302, at least one sensor 50 detects submission of payment, the user submitting the payment, or potential users of the portable toilet facility 10. In step 303, the at least one sensor 50 sends a signal indicative of the number of potential users detected to the operating device 100. In embodiments without a sensor 50, the at least one payment device 30 may send a signal indicative of payment at the at least one payment device 30, upon submission of payment by a user, to the operating device 100.

In step 304, once the operating device 100 receives a signal from the at least one payment device 30 or the at least one sensor 50, the operating device 100 logs the information received through the signal along with the time the operating device 100 received the signal. In step 305, the operating device 100 calculates the frequency of use or time between uses based on the log created in step 304. In step 306, the operating device determines a current price associated with use of the portable toilet facility 10 based on the frequency of use or the time between uses (or based on other data). In many embodiments, the operating device 100 increases the price as the frequency of use increases and decreases the price as the frequency of use decreases.

In step 307, the operating device 100 sends a signal indicative of the current price to use the portable toilet facility 10 to the at least one price-communication device 40. In step 308, once the at least one price-communication device 40 receives a signal from the operating device 100, the at least one price-communication device 40 communicates the current price to potential users of the portable toilet facility 10. In step 309, user demand changes based on the price the price-communication device 40 communicates to potential users. Generally, user demand increases when the price is lower and decreases when the price is higher.

In an illustrative embodiment, any of the embodiments disclosed herein may include an emergency openings, for example, in the form of an emergency door, emergency window, or other escape exit, and/or an emergency switch that unlocks or opens the door 14 and/or other emergency opening.

In other illustrative embodiments, any of the embodiments disclosed herein may include one or more manual or automatic cleaning mechanisms. Cleaning mechanisms may be selected from robotic cleaners, a power wash scrubber, wet wipes being available, or any other suitable mechanism for cleaning a toilet facility.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

I claim:

1. A portable toilet facility, comprising:
   an enclosure comprising a floor, a ceiling, at least one side wall, and at least one door positioned within the at least one side wall;
   a holding tank disposed inside the enclosure for the storage of waste;
   a toilet structure disposed inside the enclosure, the toilet structure being in fluid communication with the holding tank;
   a first lock disposed within the enclosure, the first lock preventing and allowing access to the toilet structure;
   a second lock coupled to the at least one door, the second lock preventing and allowing access to the at least one door;
   at least one payment device coupled to the enclosure;
   a control system coupled to the enclosure, the control system being operatively connected to the first lock, the second lock, the at least one payment device, and at least one price-communication device, the control system including a processor programmed to execute device logic to:
      send a signal to unlock the second lock upon receipt of payment at the payment device, thereby unlocking the door;
      send a signal to unlock the first lock upon closure of the door, thereby allowing access to the toilet structure;
      send a signal to lock the first lock upon closure of the toilet structure; and
      send a signal to lock the second lock upon closure of the door after exit by a user; and
   a power source electrically connected to the control system, the first lock, the second lock, and the at least one payment device.

2. The portable toilet facility of claim 1, wherein the first lock is positioned on a cover of the toilet structure to allow selective opening of the cover of the toilet structure.

3. The portable toilet facility of claim 1, further comprising at least one sensor coupled to the enclosure, the at least one sensor positioned to detect a number of potential users, the at least one sensor being operatively connected to the control system.

4. The portable toilet facility of claim 1, further including at least one price-communication device coupled to the enclosure, the price-communication device including a display that communicates to potential users of the portable toilet facility a current price for obtaining access to the toilet structure.

5. The portable toilet facility of claim 4, wherein the processor is further programmed to execute device logic to:
   detect a number of potential users of the portable toilet facility or calculate price based on frequency of consecutive uses; and
   send a signal to display a current price for use of the portable toilet facility at the at least one price-communication device.

6. A method of providing a portable toilet facility with variable pricing devices, the portable toilet facility comprising an enclosure with at least one door, at least one toilet structure disposed inside the enclosure, a first lock operatively connected to the toilet structure, a second lock operatively connected to the at least one door, at least one payment device coupled to the enclosure, at least one price-communication device coupled to the enclosure and including a display, and a control system including memory storing device logic and a processor in electronic communication with the memory, the processor executing the device logic to:
   receive a signal indicative of a time between uses of the portable toilet facility;
   determine a current price associated with use of the portable toilet facility using the signal indicative of the time between uses of the portable toilet facility; and
   send a signal to the at least one price-communication device with the current price.

7. The method of claim 6, wherein the processor further executes the device logic to:
   receive a signal indicative of payment at the at least one payment device upon submission of payment by a user at the current price;
   unlock the second lock upon acceptance of payment at the current price, thereby providing access to the at least one door;
   unlock the first lock upon closure of the at least one door, thereby providing access to the at least one toilet structure; and
   lock the second lock upon exit of the portable toilet facility by a user.

8. The method of claim 7, further including the step of locking the first lock upon closure of the toilet structure or exit of the portable toilet facility by the user.

9. The method of claim 7, wherein upon payment at the at least one payment device, a one-time code or password is provided to the user to open the second lock.

10. The method of claim 6, wherein the processor is continuously:

determining a current price associated with use of the portable toilet facility using the signal indicative of the time between uses of the portable toilet facility; and sending a signal to the at least one price-communication device with the current price.

11. The method of claim 6, wherein, upon exit of a current user, determines a current price associated with use of the portable toilet facility based on time passed between exit of one user and payment by the next and sends a signal to the at least one price-communication device with the current price.

12. The method of claim 6, wherein the lesser an average time between exit of one user and entrance of the next, the greater the current price.

13. The method of claim 12, wherein the greater an average time between exit of one user and entrance of the next, the less the current price.

14. The method of claim 6, wherein the time between uses is calculated as a time between exit through the at least one door by a first user and payment by a second user.

15. A portable toilet facility, comprising:

an enclosure comprising a floor, a ceiling, at least one side wall, and at least one door positioned within the at least one side wall;

a first lock disposed within the enclosure, the first lock preventing and allowing access to a toilet structure;

a second lock coupled to the at least one door, the second lock preventing and allowing access to the at least one door;

at least one payment device coupled to the enclosure; and a control system coupled to the enclosure, the control system being operatively connected to the first lock, the second lock, the at least one payment device, and at least one price-communication device, the control system including a processor programmed to execute device logic to:

send a signal to unlock the second lock upon receipt of payment at the payment device, thereby unlocking the door;

send a signal to unlock the first lock upon closure and locking of the door, thereby allowing access to the toilet structure; and send a signal to lock the second lock upon closure of the door after exit by a user.

\* \* \* \* \*